(12) United States Patent
Veres et al.

(10) Patent No.: US 7,668,109 B2
(45) Date of Patent: Feb. 23, 2010

(54) METHOD FOR DETERMINING MOBILE TERMINAL PERFORMANCE IN A RUNNING WIRELESS NETWORK

(75) Inventors: Andras Veres, Budapest (HU); Istvan Szabo, Budapest (HU); Tamas Borsos, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 476 days.

(21) Appl. No.: 10/597,333

(22) PCT Filed: Jan. 30, 2004

(86) PCT No.: PCT/EP2004/000898
§ 371 (c)(1),
(2), (4) Date: Jul. 20, 2006

(87) PCT Pub. No.: WO2005/076644
PCT Pub. Date: Aug. 18, 2005

(65) Prior Publication Data
US 2007/0105544 A1    May 10, 2007

(51) Int. Cl.
*H04L 1/00* (2006.01)
(52) U.S. Cl. .................. 370/252; 370/394; 455/423; 455/67.11
(58) Field of Classification Search .......... 455/67.11, 455/67.14, 423–425, 452.2, 453; 370/252, 370/338, 394, 474; 709/224; 714/39, 47, 714/748
See application file for complete search history.

(56) References Cited

U.S. PATENT DOCUMENTS

| 6,088,588 | A * | 7/2000 | Osborne ................... 455/425 |
| 6,801,940 | B1 * | 10/2004 | Moran et al. ............... 709/224 |
| 7,072,961 | B1 * | 7/2006 | Maclean et al. ............ 709/224 |
| 7,324,815 | B2 * | 1/2008 | Ross et al. ................. 455/425 |
| 2003/0142629 | A1 * | 7/2003 | Krishnamurthi et al. .... 370/249 |
| 2004/0058652 | A1 * | 3/2004 | McGregor et al. ....... 455/67.13 |
| 2006/0198359 | A1 * | 9/2006 | Fok et al. .................. 370/351 |

FOREIGN PATENT DOCUMENTS

| EP | 0 948 165 A | 10/1999 |
| WO | WO 02/17612 A | 2/2002 |

* cited by examiner

*Primary Examiner*—Patrick N Edouard
*Assistant Examiner*—Anthony S Addy

(57) ABSTRACT

In a second variation, the system, which is configured to determine the performance of a mobile terminal within a wireless communications network, may comprise a first message receiving unit for receiving messages transmitted via the communications network associated with user transactions, a second message receiving unit for receiving messages transmitted via the communications network associated with mobile terminal type information, a correlating unit for correlating data within the received user transaction messages with data within the mobile terminal type information messages, and a derivation unit for deriving one or more performance indicators by mobile terminal type information from the correlated data.

18 Claims, 5 Drawing Sheets

METHOD FOR DETERMINING MOBILE TERMINAL PERFORMANCE IN A RUNNING WIRELESS NETWORK

FIELD OF THE INVENTION

The invention relates to mobile communications. More specifically, the invention relates to a technique for determining the performance of mobile communications terminals, such as mobile telephones.

BACKGROUND OF THE INVENTION

Qualitative assessments of mobile communications network performance are essential for network operators to ensure that an offered service meets certain requirements. Such information is particularly useful in determining quality of service (QoS) in mobile communications network standards such as General Packet Radio Service (GPRS), Enhanced Data Rates for GSM Evolution (EDGE), Universal Mobile Telecommunication System (UMTS), etc.

While statistics regarding the overall performance of a mobile data network or portions thereof provide useful performance metrics in some circumstances, the most pertinent data relates to user perceived application level performance. The analysis of application level performance can be quite complex as application level performance may be dependent on factors such as various network components and their performance (e.g., packet/signalling delays in the Serving GPRS Support Node or the Base Station Controller), radio protocol performance, transmission/application level protocols (e.g., TCP or WAP), radio conditions present within a cell, as well as the mobile equipment utilized. Performance metrics correlated to the type of mobile terminal type, such as multi-slot capability, packet processing time, software/hardware speed, protocol implementation, and radio signal processing are particularly useful as the type of mobile terminal has a significant effect on application QoS.

Conventional GPRS network systems utilize an Operation and Maintenance System for passively monitoring statistical performance indicators. These indicators, which comprise counters and statistics about events in different parts of the system (such as cells, Base Station Controllers, or GPRS Support Nodes) are used for monitoring network performance and the supervision of network resources. While these statistics contain aggregated data regarding the overall performance of the network (through indicators such as network equipment performance, radio protocols, radio condition variations by geographical location, end user equipment performance, etc.), such data is not suitable for characterizing specific device groups (such as the performance of a specific type of mobile terminal). Furthermore, these statistics only relate to lower protocol layers (e.g., radio protocols, cell resources, TBF allocations, etc.), rather than providing metrics regarding application level performance.

In some arrangements, it is possible to correlate QoS measurements to individual users on the Gi interface located between the Gateway GPRS Support Node and the external Public Data network and on the Gb interface located between the Serving GPRS Support Node and the Packet Control Unit. These correlations identify users through their International Mobile Subscriber Identity (IMSI) or Mobile Station International ISDN Number (MSISDN). While these statistics can be useful in analyzing individual usage statistics, the IMSI and MSISDN are associated with the Subscriber Identity Module (SIM) card, which may be used in connection with multiple types of mobile terminals (and so one cannot accurately assess performance by mobile terminal type).

Currently, there are some techniques that generate application performance statistics and benchmarks relating to unique mobile terminal types, but these techniques are not feasible for widespread adoption. For example, performance metrics may be generated through active measurement of mobile terminal performance (e.g., TEMS Investigation). When implemented for stationary tests, the mobile terminal remains at a fixed location, and for drive tests, the mobile terminal may be moved around during the test period. This approach is limited in that in order to get a statistically relevant amount of data, a large number of measurements must be conducted at different locations, and these measurements must be repeated for new applications and for each new mobile terminal as it becomes available. Furthermore, with this methodology, user data traffic is generated solely for the purpose of performance measurements, which often results in artificial measurements that do not accurately reflect typical mobile terminal usage.

Performance statistics for benchmarking may also be generated through passive techniques by capturing user data packets in the network to reconstruct the application or session level protocol conversation for mobile terminals. For example, a device within each mobile terminal may record various transaction statistics of interest which are periodically transmitted to a central interface unit for collection and evaluation. However, it will be appreciated that such an arrangement would unnecessarily burden the communication network by consuming bandwidth and would require the cooperation of each mobile terminal manufacturer for implementation.

It may also be possible to extract performance statistics from the Serving GPRS Support Node as it maintains the location of an individual mobile terminal in the Mobility Management context and in the Packet Data Protocol context for mobile terminals in STANDBY and READY states. While these context fields include the International Mobile Equipment Identity (IMEI) which can be used to determine the identity of the mobile terminal, such an arrangement would require significant changes in the software for the communications network and would also require each mobile terminal vendor to make certain changes to their mobile terminals.

Consequently, it can be appreciated that there is a need for an improved technique for assessing the performance of mobile communications terminals on a type-by-type basis.

SUMMARY OF THE INVENTION

The invention is embodied in a method for determining the performance of a mobile terminal within a wireless communications network. The method commences with the step of receiving messages transmitted via the communications network associated with user transactions and receiving messages transmitted via the communications network associated with mobile terminal type information. Data within the received user transaction messages are then correlated with data within the mobile type information messages. This correlation allows for the derivation of one or more performance indicators by mobile terminal type information from the correlated data. The invention may also include the step of acquiring the user transaction and mobile terminal type information messages transmitted via the communications network.

In another embodiment, the invention is provided in a method for determining the performance of a mobile terminal within a wireless communications network. The method includes the steps of receiving messages transmitted via the communications network associated with user transactions and receiving messages transmitted via the communications network associated with mobile terminal type information. In addition, performance indicators regarding the user transactions are derived from the received user transaction messages and those performance indicators are then correlated with data within the mobile terminal type information messages. The method may further include the step of acquiring the user transaction and mobile terminal type information messages transmitted via the communications network.

The terminal type information may be included in the user transaction messages (or vice versa). In such a scenario the correlation step(s) may correlate data relating to terminal type information that was derived from a user transaction message with the user transaction data contained in the user transaction message.

The correlation step may include a determination and an assessment of permanent or temporary identifiers included in or otherwise associated with the received messages. The identifiers may be used to identify messages that allow a correlation with one or more further messages. A determination and assessment of identifiers can be dispensed with if the terminal type information and the user transaction data are included in a single message.

In some arrangements, the mobile terminal type information messages include mobility management signalling messages. Depending on the communications network and the protocol utilized, the mobility management signalling messages may include information about the type of a mobile terminal, such as the International Mobile Equipment Identity for the mobile terminal type. In some variations, the method also includes the step of adjusting the frequency of mobile messaging signals required by the communications network to increase the number of messages containing data to identify the mobile terminal type. Additionally, or alternatively, the occurrence probability of type information in the mobile messaging signals may be adjusted. Such an adjustment ensures that there will be sufficient type information transmitted over the communications network to promptly and accurately identify the mobile terminal type.

In addition, messages containing user data (e.g., provided in user data packets) may also be acquired. Based at least in part on the user data (or user data packets), one or more user transactions may be reconstructed. This reconstruction may be used to identify the one or more user transactions for associating certain performance indicators thereto and for correlating mobile terminal type information therewith. As the user data will usually be generated by internal applications residing on a particular mobile terminal, the performance indicators associated therewith will permit an assessment (and benchmarking) of mobile terminal types on an application level (in contrast to, for example, a network level).

The user transaction messages may also or alternatively include session management signalling messages. In such a case, the method may also include the step of reconstructing the user sessions from the data within the acquired messages. In other words, the performance indicators may at least partially be based on the session management signalling messages which provide certain data regarding the user sessions which may in turn be used to quantitatively and/or qualitatively assess performance related criteria associated with the user transactions (which will be, or have previously been, correlated to specific mobile terminal types).

The performance indicators determined when practicing the current invention may include any criteria that may be useful in assessing or benchmarking the performance of certain types of mobile terminals within a communications network based on user transactions (and preferably on an application level). For example, the performance indicators may be dependent on processing time, radio signal decoding performance, radio signal transmission performance, multi-slot capability, application software performance, effect of protocol implementation on application level performance, throughput, number of unsuccessful transactions, number of user aborted transactions, and packet ratio loss.

More specifically, the performance indicators may be based on the period of time measured from the transmission of a message and the receipt of an acknowledgment signal for the transmitted message. In other arrangements, the performance indicators may be based on messaging downlink/uplink throughput (such as for MMS—Multimedia Messaging Service messages) or IP level throughput. The performance indicators may also be based on the ratio of user aborted transactions (e.g., ratio of user aborted WAP—or MMS transactions) and/or the number of lost packets estimated from (e.g., WAP) retransmissions.

Once the performance indicators have been calculated or otherwise derived for a particular type of mobile terminal, they may be used for benchmarking purposes (e.g., for benchmarking of different types of mobile terminals or against previously measured data). Accordingly, benchmarking statistics may be provided by mobile terminal type, user transaction type, user session type, geographical area, communications network, as well as any other statistical measures that may be relevant for assessing performance.

In some variations of the invention, the method further includes the step of constructing a performance database having fields that identify the type of mobile terminal (and, if required, the type of user transaction) and corresponding fields that include calculated or estimated performance indicators. Such a performance database is useful for easy access to historical data which may be used for benchmarking purposes.

The method may be implemented on a communications network that operates on an open interface to minimize the impact of the performance monitoring on the operations of the communications network as well as the mobile terminal. Depending on the communications network and protocol utilized, the open interface may include a General Packet Radio Service Interface between a Gateway General Packet Radio Service Support Node and a Packet Control Unit, a General Packet Radio Service Interface between a Gateway General Packet Radio Service Support Node and an external Public Data Network, a General Packet Radio Service Interface between General Packet Radio Service Support Nodes, an interface that links the Radio Network Controller with either a Mobile Switching Center or a General Packet Radio Service Support Node, or an interface between a core network and the UMTS Terrestrial Radio Access Network (UTRAN).

In another embodiment, the invention is embodied as a computer program product comprising program code portions for performing the previously described method steps when the computer program product is run on a computer system. In some variants, the computer program product is stored on a computer readable recording medium.

In yet another embodiment, a system comprising a computer processor and a memory coupled to the processor is provided. In this arrangement, the memory is encoded with one or more programs that may perform any of the previously described method steps.

The invention may also be embodied in a system for accomplishing the methods described above. For example, in one variation, the invention may comprise a system for determining the performance of a mobile terminal within a wireless communications network. The system comprises a first message receiving unit for receiving messages transmitted via the communications network associated with user transactions, a second message receiving unit for receiving messages transmitted via the communications network associated with mobile terminal type information, a derivation unit for deriving, from the received user transaction messages, one or more performance indicators for the user transactions, and a correlation unit for correlating the performance indicators regarding the user transactions with data within the mobile terminal type information messages.

In a second variation, the system, which is configured to determine the performance of a mobile terminal within a wireless communications network, may comprise a first message receiving unit for receiving messages transmitted via the communications network associated with user transactions, a second message receiving unit for receiving messages transmitted via the communications network associated with mobile terminal type information, a derivation unit for deriving, from the received user transaction messages, one or more performance indicators for the user transactions, and a correlation unit for correlating the performance indicators regarding the user transactions with data within the mobile terminal type information messages.

One system or both systems may optionally further include one or more acquisition units for acquiring either one or both of the user transaction messages and mobile terminal type information messages transmitted via the communications network. The one or more acquisition units may be co-located with or remote from the remaining system units.

BRIEF DESCRIPTION OF THE DRAWINGS

In the following the invention will be described with reference to exemplary embodiments illustrated in the figures, in which.

DETAILED DESCRIPTION OF THE PREFERRED EMBODIMENTS

In the following description, for purposes of explanation and not limitation, specific details are set forth, such as particular sequences of steps and various configurations, etc. in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, where the memory is encoded with one or more programs that may perform the methods disclosed herein.

Figure 1:
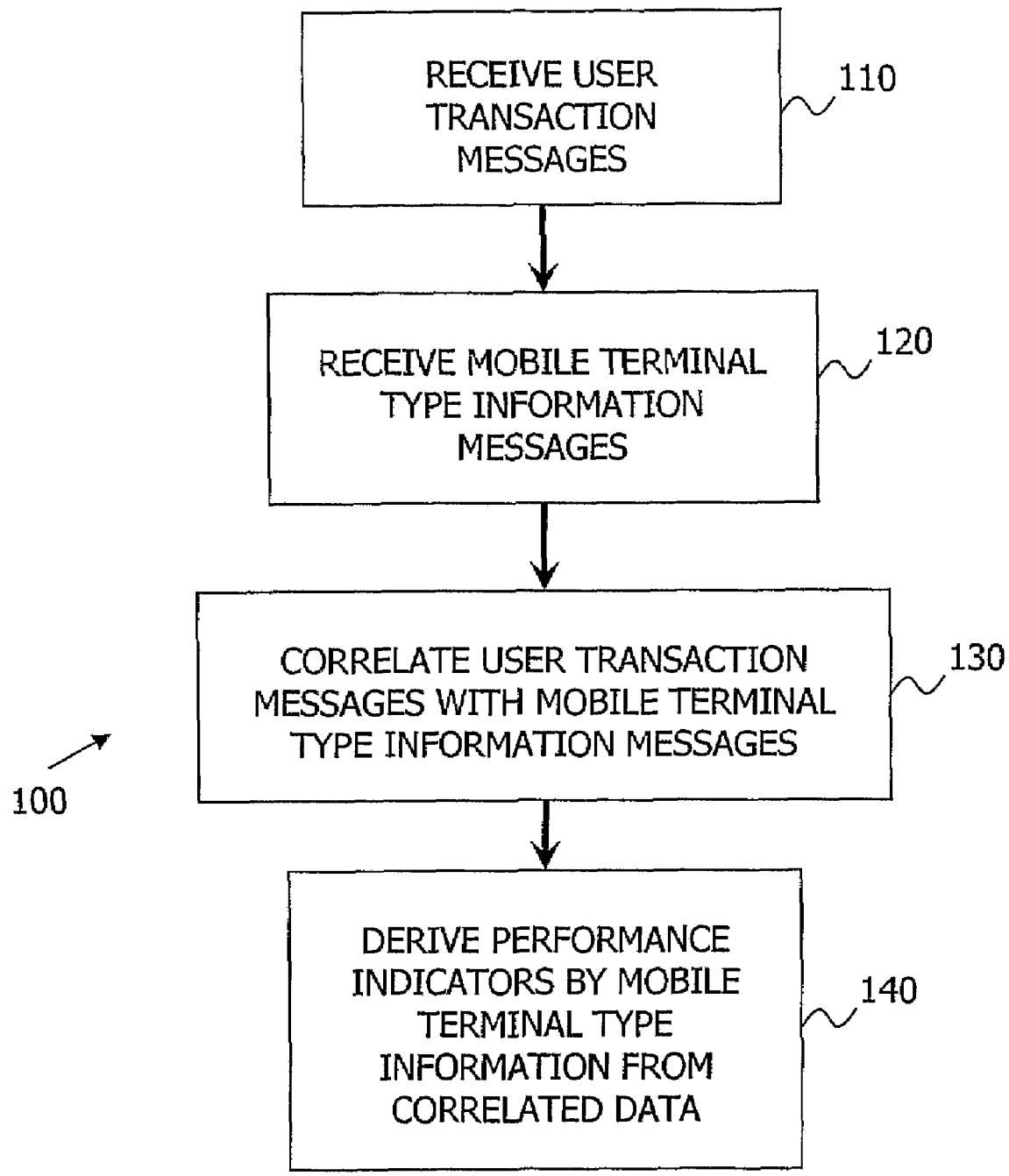
FIG. 1 is a process flow diagram according to an embodiment of the invention.

FIG. 1 illustrates a process flow diagram 100 according to a first embodiment of the invention. The flow diagram relates to a passive monitoring technique for determining the performance of a mobile terminal, where, at step 110, messages are received that contain data regarding one or more user transactions. At step 120, messages are received containing data having mobile terminal type information. Once the user transaction messages and mobile terminal type information messages are received, the data pertaining to user transactions are correlated with the data pertaining to mobile terminal type information at step 130. Once the correlation has been completed, performance indicators may be calculated by mobile terminal type information from the correlated data correlated at step 140. Although not shown, the method may also include the step or steps of sampling user transactions messages and mobile terminal type information messages from a communications network (such as a wireless mobile telecommunications network).

One of ordinary skill in the art will also appreciate that the above steps may be modified such that the method derives, at step 140, from the received messages performance indicators regarding the one or more user transactions and then subsequently correlates the performance indicators regarding the one or more user transactions with the mobile terminal type information. Further details regarding this process are described below.

Figure 2:
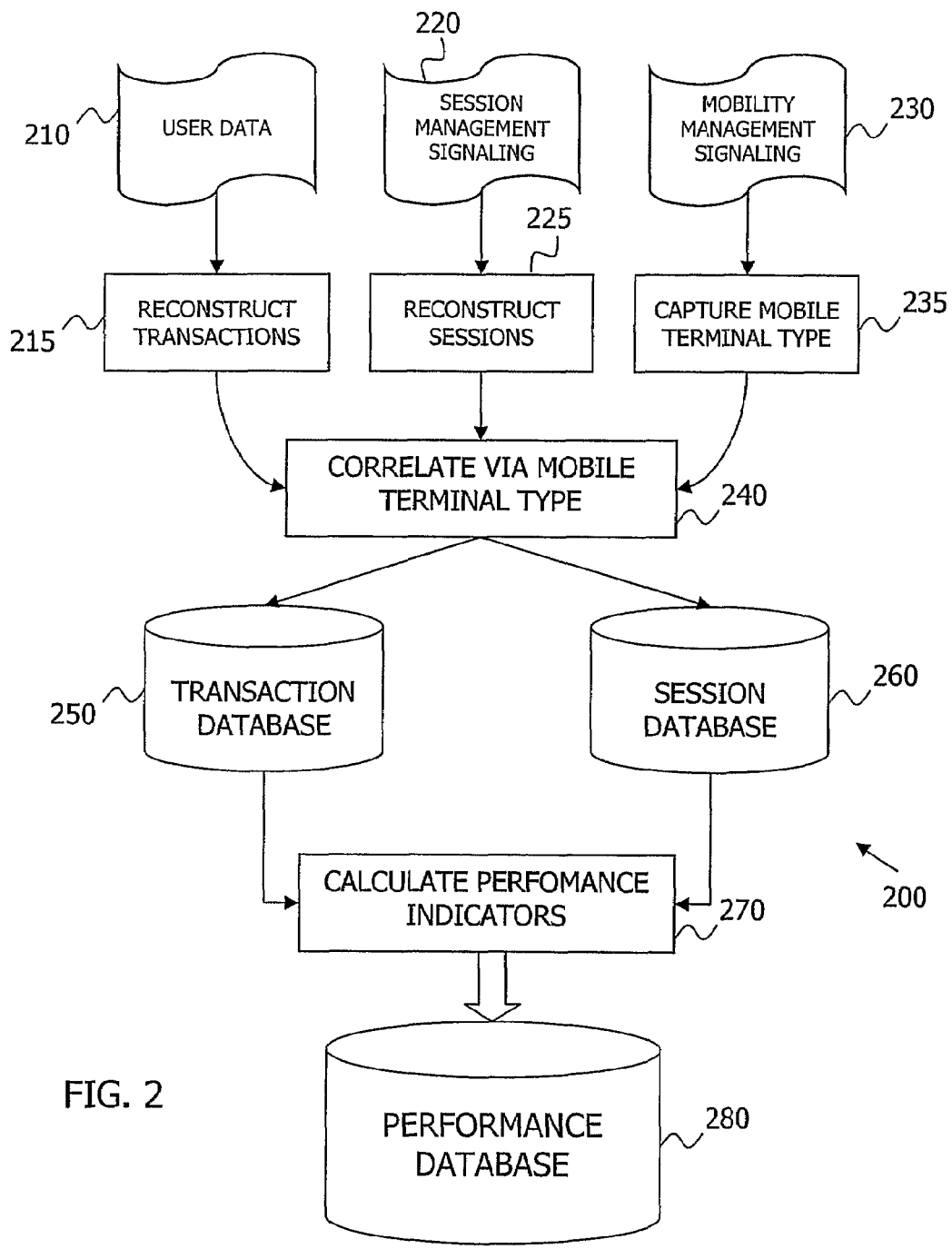
FIG. 2 is a process flow diagram useful for understanding certain aspects of the invention.

FIG. 2 illustrates a schematic process flow diagram 200 relating to the acquisition of source data for determining various performance indicators for each mobile type. The schematic diagram relates to the acquisition of data within messages acquired from an open interface of the communications network that generally relate to three categories, namely user data 210, session management signalling 220, and mobility management signalling 230.

The user transaction messages containing user data 210 are typically acquired (or sampled) between the core network and the radio network, and/or between the core network and external networks. The preferred point to acquire or sample user data messages is dependent upon the number of measurement points, the identifiers available within the messages so that the messages may be correlated with user transactions, as well as security measures employed in the communication network.

The user transaction messages containing session management signalling 220 (e.g., messages such as Create PDP Session, Delete PDP Session, etc.) define the user packet sessions. These messages may be acquired or accessed on two or more interfaces such as the Gb interface (located between the Serving GPRS Support Node and the Packet Control Unit), Gn interface (located between the GPRS Support Nodes), and Radius interface (i.e., the Remote Authentication Dial-In User Service that secures remote access to networks and network services against unauthorized access) in a General Packet Radio Service (GPRS)/Enhanced Data rates for Global Evolution (EDGE) network.

The mobile terminal type information messages containing mobility management signalling 230 relate to mobility functions provided by a Public Land Mobile Network (PLMN) such as a Global System for Mobile communication (GSM) network or Universal Mobile Telecommunications System (UMTS) network. The mobility management signalling messages track a mobile terminal as it moves throughout the network to ensure that communication is maintained. The mobility management signalling messages 230 may contain an identifier to uniquely identify each mobile terminal such as an International Mobile Equipment Identity (IMEI).

The IMEI is typically a fifteen digit number that includes a Type Approval Code (TAC) of six digits that is used to identify the mobile terminal equipment manufacturer and the terminal type, a Final Assembly Code (FAC) of two digits that identifies where the mobile terminal was manufactured, a Serial Number (SNR) of six digits that with the TAC and FAC uniquely identifies the mobile terminal, and a spare digit. In some networks, mobility management signalling messages 230 may contain an International Mobile Equipment Identity and Software Version (IMEISV) which is a sixteen digit identifier that includes the TAC, FAC, SNR, as well as a two digit identifier relating to the software version of the mobile terminal.

In most communication networks, the frequency of mobility management signalling messages is not standardized (and is SGSN implementation dependent). However, some network nodes may be configured to permit the IMEI check to be switched on and off and to change the frequency of the IMEI check, as the mobile terminal sends its IMEI whenever requested. With such a configuration, with the participation of the communications network operator, the IMEI check may be maintained either in a constant "on" polarity or at a fixed or variable frequency during performance indicator measurements.

The messages containing user data 210 are reconstructed in step 215 to determine what type of user transactions the mobile terminal was processing. Acquired messages containing IP packets are processed one by one and the packets belonging to the same application transaction of the same user are grouped together. These groups can be created by examining fields in the IP header such as the source IP address, destination IP address, source port, and destination port. Applications can be identified by port number (e.g., TCP port 80 is used for web traffic). Depending on the application logic, identified packet groups can be further divided into user transactions such as TCP connections, HTTP object downloads, WAP object downloads, and the like. After the all of the packets for a particular transaction are collected, condensed information (e.g., start, end, duration, amount of data in uplink and downlink, success, failure of the transaction, etc.) may be generated.

In step 225 the messages containing data pertaining to session management signalling 220 are reconstructed to determine the underlying session information which will subsequently be used to assess the performance of a mobile terminal. During session management signalling, a subscriber is identified by one of its unique identifiers in the mobile system (for example, its International Mobile Subscriber Identify) and the system responds with an IP address, which the mobile terminal can use for its application transaction. By parsing through these signalling messages, the required association between subscribers and their data sessions and application transaction can be established. Summary data (type and number of transactions, total number of uplink and downlink traffic, Quality of Service profile) is generated for transactions belonging into the same user session. The messages containing mobility management signalling 230 are used to determine the mobile terminal type in step 235.

The user transactions, sessions, and mobile types are then correlated by mobile terminal type in step 240. The correlation may be based on identifiers associated with the acquired messages. Such identifiers include for example a telephone number, a port number, and the like.

Information regarding the various user transactions is stored within a transaction database 250 and information regarding the various user sessions is stored within a session database 260. From these two sources, the performance indicators may be calculated in step 270 (e.g., by mobile terminal type) and subsequently stored for access and review within a performance database 280. The performance indicators may be derived by accessing transaction records within the transaction database 250 associated with a desired key performance indicator for each type of desired mobile terminal type. For example, if the key performance indicator relates to user transaction time, the timestamp of a first data packet and a time stamp of the last data packet for a particular transaction may be accessed from the transaction records for each type of mobile terminal. Multiple measurements from the same type of mobile terminal may be averaged to provide a single performance indicator for each mobile terminal type.

One of ordinary skill in the art will appreciate that the transaction database 250, the session database 260 may be combined with the performance database 280 depending on design preferences. As separate databases, the transaction database 250 provides useful information regarding the performance of the applications and the session database 260 provides information such as characteristics of PDP sessions within a particular GPRS network.

The amount of delay, throughput, unsuccessful transactions, and packet loss are typically the measures most useful in determining quality of service. Delay may be calculated based on a variety of measurements. For example, delay may be calculated based on the round trip time of a Wireless Transmission Protocol (WTP) data packet or a Multimedia Messaging Service (MMS) data packet based on the time measured from the WTP Result and WTP ACK as calculated for small packets (less than 200 bytes) and large packets (between 900 and 1100 bytes). Delay may also be calculated based on a group of packets, such as the transmission and acknowledgment time for a group of four packets.

Throughput may be a measure of downlink/uplink throughput (such as based on MMS or SMS messages) or it may be based on the IP level throughput during a bandwidth demanding TCP connection (during HTTP GET/PUT or FTP RETR/PUT) (for example, please see "A Large-scale, Passive Analysis of End-to-End TCP Performance over GPRS" Peter Benko, Gabor Malicsko, Andras Veres, IEEE Infocom, Hong Kong, March 2004, herewith incorporated by reference). The number of unsuccessful transactions may be based on the ratio of user aborted WAP or MMS transactions and the packet loss may comprise the ratio of loss packets estimated from WAP retransmissions.

Figure 3:
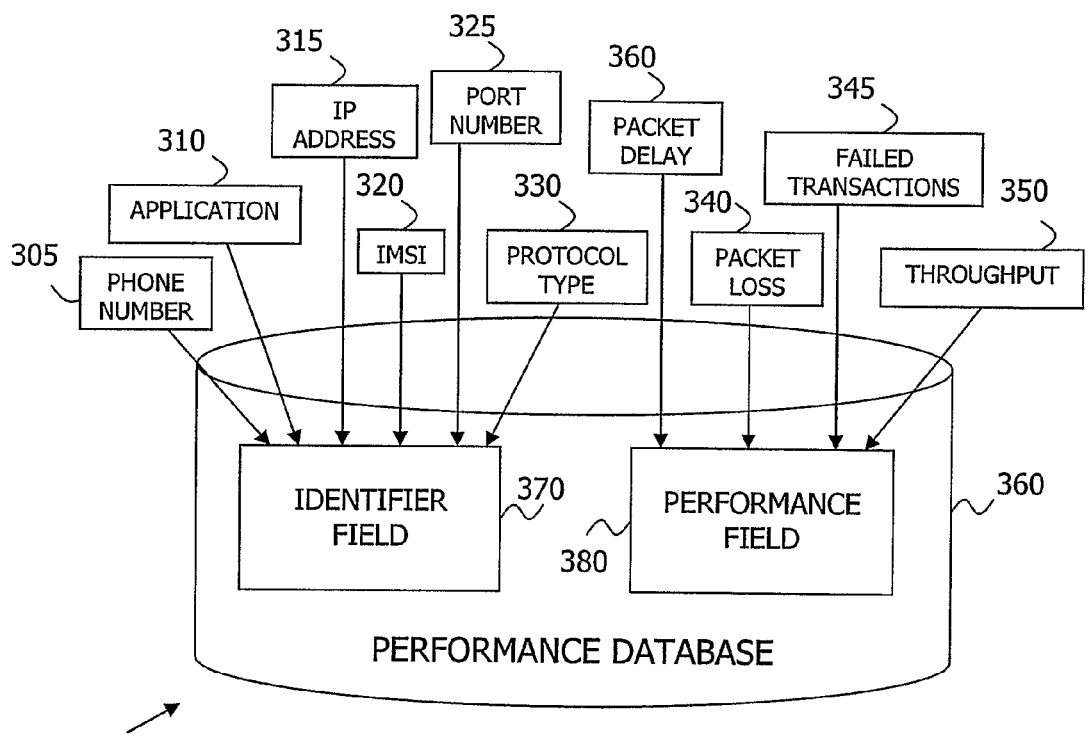
FIG. 3 is a process flow diagram useful for understanding certain further aspects of the invention.

With regard to FIG. 3, a schematic flow diagram 300 is provided that illustrates that in some variations, a performance database 380 includes an identifier field 370 and a performance field 380. The performance database 380 is built by assigning each captured packet to its mobile terminal type, user transaction (such as a web object download or sending an MMS message) and session. The identifier field 370 is populated with data pertaining, for example, to the user or protocol utilized as extracted from acquired messages. The identifier field 370 might contain information such as phone number 305, the particular application that was utilized for the user transaction 310, the IP address of the mobile terminal 315, the International Mobile Subscriber Identity (IMSI) 320 (and/or the mobile terminal type), the port number 325 for the Service Access Point where transport protocols pass information to higher layers, and the protocol type 330 utilized. The performance field might contain performance information correlating to the identified mobile terminal type (and related identifying information) such as packet delay 335 (based on the amount of time from the transmission of a packet to the receipt of a corresponding acknowledgment), packet loss 340 (estimated from retransmissions), failed transactions 345, and overall throughput 350.

For GPRS and E-GPRS networks, mobile terminal identifiers (e.g., IMEI/IMEISV) are contained within messages communicated between the mobile terminal and the Serving GPRS Support Node (SGSN) in the GPRS Mobility Management (GMM) Protocol. These protocol messages are available on the Gb interface (which is located between the SGSN and the Packet Control Unit) and may be acquired or captured during an Authentication Procedure (that is typically part of the GPRS Attach Procedure) or Identity Check Procedure.

The SGSN may require the IMEI/IMEISV from the mobile terminal in GMM messages such as AUTHENTICATION AND CIPHERING REQUEST or IDENTITY REQUEST. The Authentication and Ciphering Request contains the IMEISV request information element (IE). If the information element indicated that IMEISV is requested, the mobile terminal must provide it in the corresponding Authentication and Ciphering Response message, and this message is acquired to determine mobile terminal type. In addition, the GMM Identity Request message contains an identifier type information element to specify which identifier type is requested. It can be the IMSI, IMEI, IMEISV or Temporary Mobile Subscriber Identity (TMSI).

An SGSN may initiate the Authentication or the Identity Check procedures during a GPRS attach as well as in certain cases while the mobile terminal is attached. While IMEI check is not included in all attach procedures, it is not always necessary to determine the IMEI for all user data traffic. In addition, even if the Gb interface is encrypted, the GMM Attach Request, Authentication Request/Response, and Identity Request/Response messages will still be available as they are not ciphered.

The current invention may be configured to analyze a wide variety of key performance indicators that may be useful to network operators as well as mobile terminal manufacturers and application developers. Of particular interest are those properties which may be uniquely attributed to the type of mobile terminal utilized such as radio signal decoding/transmission performance, packet processing speed (in hardware), multi-slot capability, application software performance (WAP, MMS, etc.), and effect of protocol implementation on application level performance.

Figure 4:
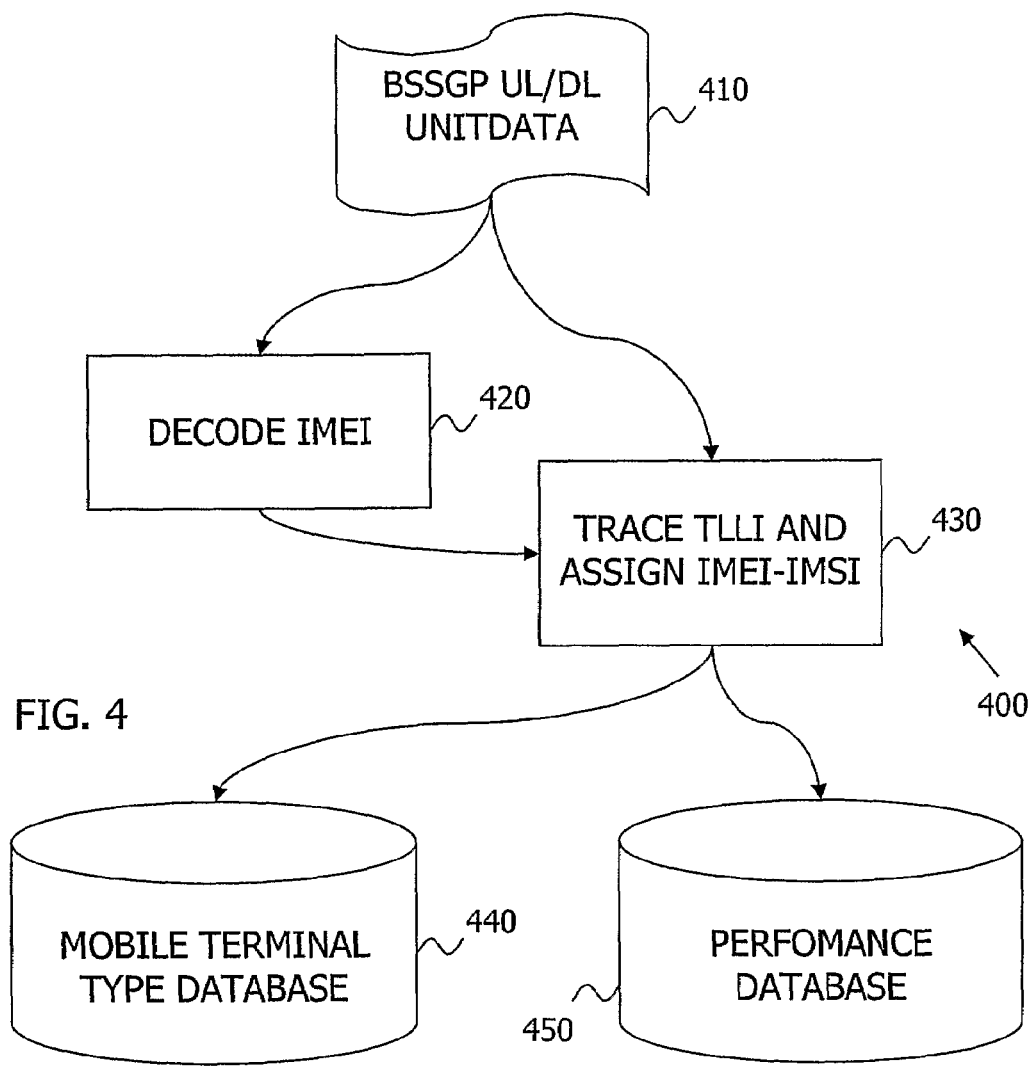
FIG. 4 is a schematic useful for understanding certain additional aspects of the invention.

With regard to FIG. 4, a sample methodology for determining the IMEI is illustrated as a process flow diagram 400. With this arrangement, the Base Station System GPRS Protocol (BSSGP) UL/DL UNITDATA packets, at step 410, are sampled from the Gb interface. The BSSGP is a protocol layer between the SGSN and the Base Station System (BSS), which is the layer that is also used by GMM protocol messages. A BSSGP UNITDATA Protocol Data Unit (PDU) header includes a Temporary Logic Link Identifier (TLLI), while the downlink packets include the IMSI.

The TLLI is used for addressing GPRS users between the SGSN and the BSS. The logical link between the mobile terminal and the SGSN is uniquely identified by the TLLI. While the SGSN may alter the TLLI value, the BSSGP header continues to contain the previous TLLI information element.

From GMM protocol messages, at step 420, the IMEI may be determined or decoded along with the relevant TLLI. The IMEI and TLLI information is then used, along with timestamp information, TLLI information and IMSI information, to trace TLLI and, at step 430, assign the IMEI identifiers to their appropriate IMSI and provide them with a time interval in which this assignment is valid. The output of this process is either directly used for online correlation with a Performance Database, at step 450, or stored in a Terminal Type Database, at step 440, for off-line processing.

At step 430, the IMEI is assigned to one or more user transactions via IMSI. In order to utilize IMSI as a user transaction identifier, the user data may be captured, sampled, or otherwise acquired in one of three manners depending on the availability of certain GPRS interfaces and network configurations.

First, if the Gb interface is not encrypted or it is possible to decipher the messages (by using Gr interface messages), then user data and session management packets can be captured on the Gb interface as Logical Link Control/Sub Network Dependence Convergence Protocol (LLC/SNDCP) PDUs. The BSSGP protocol header includes the IMSI information element in every downlink packet.

Second, the user data and session management packets may be captured on the Gn interface (which is located between the GPRS Support Nodes). With GPRS Tunnelling Protocol version 0 (GTPv0), IMSI is included every packet as part of the tunnel ID. With regard to GTPv1, the Create PDP Context Request includes the IMSI, while user packets of the PDP context are identified by the tunnel.

Third, data packets may be captured on the Gi interface (which is located between the Gateway GPRS Support Node and the external Public Data Network). Session management information may be obtained from the messages to and from the Remote Authentication Dial-In User Service (RADIUS) server. When the PDP context is activated, the MSISDN for the mobile terminal is sent to the RADIUS server. In some variations, the IMSI may also be included with the MSISDN. However, if the IMSI is not available from the acquired messages, a list of IMSI-MSISDN pairs is used to correlate IMSI with MSISDN.

The current invention may also be implemented in a Universal Mobile Telecommunications System (UMTS) as the two GMM Messages, namely Authentication and Ciphering Response and Identity Response, each may include the IMEI/IMEISV identifiers. The aspects of this embodiment are similar to those described above, except that a different interface is utilized between the core network and the radio network.

With a UMTS arrangement, the Iu interface between the core network and the UMTS Terrestrial Radio Access Network (UTRAN) is the preferred point at which to monitor the GMM Messages. The user plane uses GTP-U protocol to carry user data packets and signalling messages. The GMM messages can be acquired in the control plane, where the radio network layer is Radio Access Network Application Part (RANAP), using Signalling Connection Control Part (SCCP) services from the transport network layer.

The RANAP uses one signalling connection per active User Equipment (which is a combination of the mobile terminal and the SIM card) and core network for the transfer of layer (3) three messages. Captured packets on this interface contain the Iu signalling connection identifier which can be used for connecting the mobile station IMSI obtained from GMM Attach messages to the IMEI gained from other GMM messages. This tracing procedure can either result in the same Terminal Type Database as in the case of GPRS, or used for on-online correlation with the Performance Database.

Figure 5:
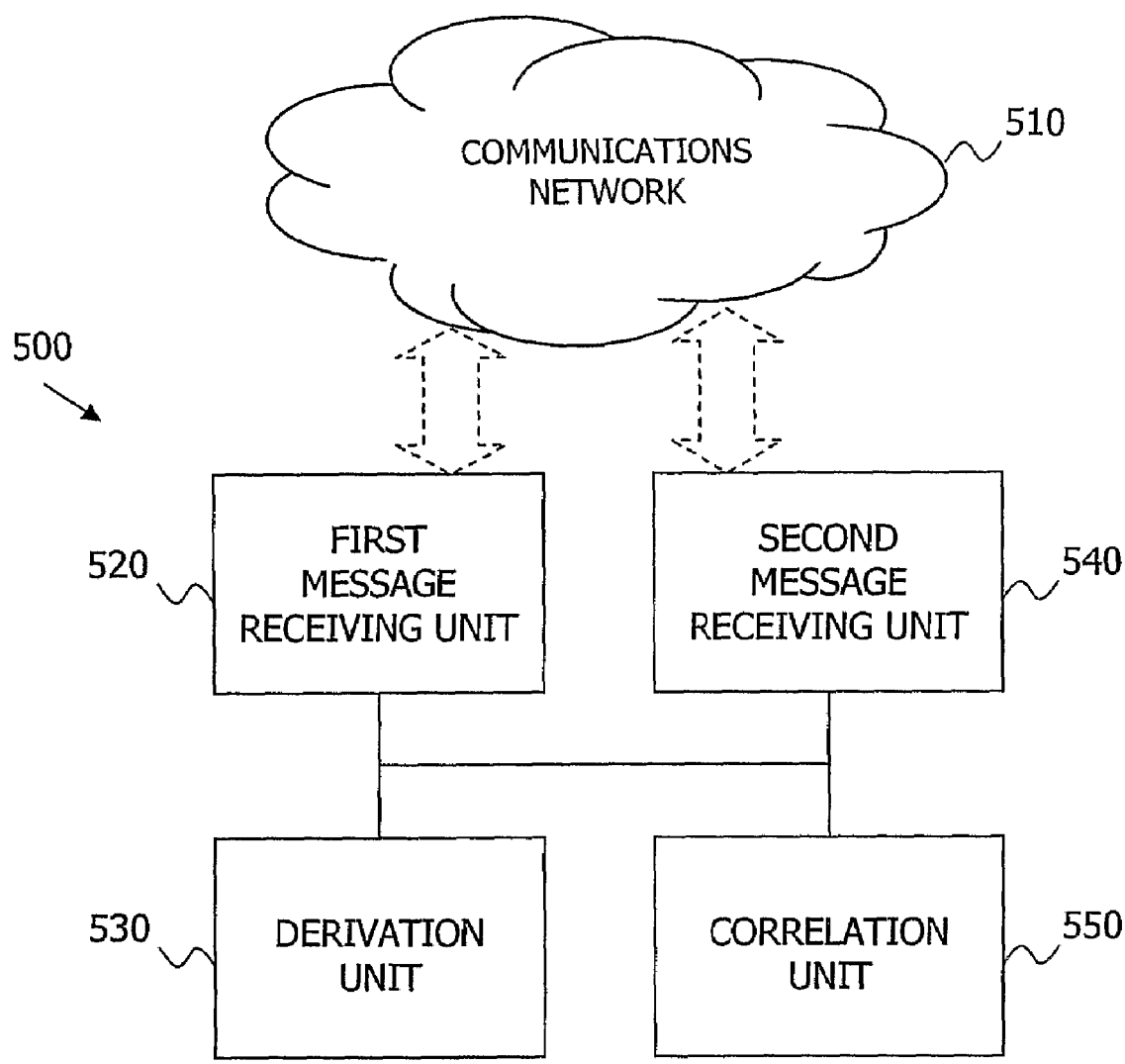
FIG. 5 is a schematic useful for understanding certain further aspects of the invention.

FIG. 5 schematically illustrates an embodiment of a system 500 for practicing the present invention. The system 500 may be arranged on the side of a network node and comprises a first message receiving unit 520, a derivation unit 530, a second message receiving unit 540 and a correlation unit 550, configured to implement a method for determining mobile terminal performance, such as that described in connection with FIG. 1. In some variations, the first message receiving unit 520, the derivation unit 530, the second message receiving unit 540, and the correlation unit 550 are coupled together, although it will be appreciated that it may not be necessary to interconnect each of the units and that certain units may be combined depending on design preferences.

The first message receiving unit 520 receives messages transmitted via a communications network 510 regarding one or more user transactions. The second message receiving unit 540 received messages transmitted via the communications network 510 regarding mobile terminal type information. The correlation unit 550 correlates data within the user transactions messages associated with data within the mobile terminal type information messages. The derivation unit 530 then analyzes the correlated data to generate one or more performance indicators of interest (e.g., delay, throughput, transaction success ratios, packet loss, etc.) by mobile terminal type information.

The derived performance indicators may then be used for a variety of analysis techniques as desired by the monitoring entity. Furthermore, the skilled artisan will also appreciate that, in the alternative, the derivation unit 530 may be configured to derive one or more performance indicators for the one or more user transactions, and the correlation unit 550 may be configured to correlate the performance indicators regarding the one or more user transactions with the mobile terminal type information. In addition, it will also be appreciated that the system may also include one or more acquisition units for acquiring the messages transmitted via the communications network and for providing the acquired messages to the first and second message receiving units 520, 540.

The skilled artisan will appreciate that there are many advantages to identifying the various effects that different types of mobile terminals have on application level performance in accordance with the invention. Such information is useful for equipment manufacturers to obtain feedback on the performance of their mobile terminals in "real world" everyday uses, the communication network operators to determine the performance of mobile terminals for various GPRS application, and vendors to more specifically identify the causes of performance degradation and to help separate network and mobile terminal performance issues.

Importantly, the invention provides a solution for (quantitatively) analyzing and benchmarking different mobile terminal types in an inexpensive passive fashion. As standardized network interfaces may be used, the methodology is vendor independent. In addition, the invention may be implemented over a wide geographic area from only one monitoring point (such as a GPRS Base Station Controller area which typically covers 100-200 cells) to provide statistical data on a geographical basis.

While the present invention has been described with respect to particular embodiments (including certain system arrangements and certain orders of steps within various methods), those skilled in the art will recognize that the present invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A method of determining the performance of a mobile terminal type within a wireless communications network, the method comprising the steps of:
    receiving messages transmitted via the communications network associated with user transactions;
    receiving messages including mobile terminal type information, transmitted via the communications network;
    deriving, from the received user transaction messages, one or more performance indicators for the user transactions;
    grouping IP packets belonging to a common application transaction of the mobile terminal type;
    reconstructing the user transactions from data within the received messages to determine underlying session information; and
    constructing a performance database having fields that identify the type of mobile terminal and the type of user transaction and corresponding fields that include calculated or estimated performance indicators.

2. The method of claim 1, further comprising the steps of:
    acquiring messages transmitted via the communications network associated with transactions; and
    acquiring messages transmitted via the communications network associated with mobile terminal type information.

3. The method of claim 1, wherein the correlating step associates the mobile terminal type information with one or more types of mobile terminal.

4. The method of claim 1, wherein the received mobile terminal type information messages include mobility management signalling messages.

5. The method of claim 4, wherein the mobility management signalling messages include the International Mobile Equipment Identity for the mobile terminal type.

6. The method of claim 1, wherein the received user transaction messages include user data.

7. The method of claim 1, further comprising the step of reconstructing the user transactions from the data within the received messages.

8. The method of claim 1, wherein the received user transaction messages include session management signalling messages.

9. The method of claim 8, wherein the step of deriving the performance indicators is based on data within the session management signalling messages.

10. The method of claim 8, further comprising the step of reconstructing user sessions from the data within the received user transaction messages.

11. The method of claim 1, wherein the step of deriving the performance indicators is based on the period of time measured from the transmission of a message and the receipt of an acknowledgment signal for the transmitted message.

12. The method of claim 1 wherein the step of deriving the performance indicators is based on at least one of messaging downlink/uplink throughput and IP level throughput.

13. The method of claim 1 wherein the step of deriving the performance indicators is based on the ratio of user aborted messaging transactions.

14. The method of claim 1 wherein the step of deriving the performance indicators is based on the number of lost packets estimated from messaging retransmissions.

15. The method of claim 1, wherein the performance indicators are benchmarked by mobile terminal type.

16. The method of claim 1 wherein the messages are acquired from an open interface.

17. The method of claim 1, further comprising the step of adjusting the frequency of mobile messaging signals required by the communications network to increase the number of messages containing data to identify the mobile terminal type.

18. An apparatus for determining the performance of a mobile terminal type within a wireless communications network comprising:
    a first message receiving unit for receiving messages transmitted via the communications network associated with user transactions;

a second message receiving unit for receiving messages associated with mobile terminal type information transmitted via the communications;

a processor associated with a database for grouping IP packets belonging to a common application transaction of the mobile terminal;

the processor reconstructing the user transactions from data within the received messages to determine underlying session information;

a correlation unit for correlating one or more performance indicators derived from the user transaction messages with data within the mobile terminal type information messages; and the processor constructing a performance database having fields that identify the type of mobile terminal and the type of user transaction and corresponding fields that include calculated or estimated performance indicators.

* * * * *